United States Patent
Okada et al.

(10) Patent No.: US 11,282,215 B2
(45) Date of Patent: Mar. 22, 2022

(54) OBJECT TRACKING METHOD AND RECORDING MEDIUM

(71) Applicant: Panasonic Intellectual Property Corporation of America, Torrance, CA (US)

(72) Inventors: Masashi Okada, Osaka (JP); Shinji Takenaka, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 70 days.

(21) Appl. No.: 17/003,473

(22) Filed: Aug. 26, 2020

(65) Prior Publication Data
US 2021/0082128 A1 Mar. 18, 2021

Related U.S. Application Data

(60) Provisional application No. 62/899,818, filed on Sep. 13, 2019.

(30) Foreign Application Priority Data

Mar. 24, 2020 (JP) .............................. JP2020-052978

(51) Int. Cl.
G06T 7/246 (2017.01)
G06T 7/73 (2017.01)

(52) U.S. Cl.
CPC ................ *G06T 7/248* (2017.01); *G06T 7/74* (2017.01); *G06T 2207/10016* (2013.01); *G06T 2207/20084* (2013.01); *G06T 2207/30196* (2013.01)

(58) Field of Classification Search
CPC ........... G06T 7/20; G06T 7/246; G06T 7/248; G06T 7/33; G06T 7/337; G06T 7/38;
(Continued)

(56) References Cited

U.S. PATENT DOCUMENTS 11,036,989 B1 * 6/2021 Assouline et al. ........................... G06K 9/00369
2020/0272148 A1 * 8/2020 Karasev et al. ......... G06N 3/08

FOREIGN PATENT DOCUMENTS

WO WO-2021/094398 A1 * 5/2021 ......... G06K 9/00208

OTHER PUBLICATIONS

B. Xiao, et al., "Simple Baselines for Human Pose Estimation and Tracking," in European Conference on Computer Vision, Aug. 2018.

(Continued)

*Primary Examiner* — Andrew W Johns
(74) *Attorney, Agent, or Firm* — Wenderoth, Lind & Ponack, L.L.P.

(57) ABSTRACT

An object tracking method includes: predicting a prediction distribution which is a distribution of each of prediction pose locations of first objects in a current frame by inputting pose time-sequence data to a pose predictor; estimating a set of locations of each of second objects in the current frame by inputting the current frame to a pose estimator; obtaining identification information indicating a one-to-one correspondence between the second objects and the first objects and location information of the second objects by matching the set of locations and the prediction distribution, to output the obtained identification information and location information; and updating the pose time-sequence data by adding, to the pose time-sequence data and based on the obtained identification information and location information, data which includes coordinates indicating a pose of each of the first objects and is obtained from the predicted prediction distribution.

8 Claims, 13 Drawing Sheets

(58) Field of Classification Search
CPC .... G06T 7/70; G06T 7/73; G06T 7/74; G06T 7/97; G06T 2207/20084; G06K 2209/21; G06N 3/02; G06N 3/0454
See application file for complete search history.

(56) References Cited

OTHER PUBLICATIONS

Masashi Okada, et al., "Multi-person Pose Tracking using Sequential Monte Carlo with a Probabilistic Neural Pose Predictor", Sep. 2019.

* cited by examiner

FIG. 9

Algorithm 1: Proposed Multi-person Pose Tracking Method

```
1  DEACTIVATEALLFILTERS()
2  for t ← 1 to ∞ do
       // (1) Pose Prediction
3      {{z_{t-L:t-1}^{(k,n)}}_{n=1}^P}_k ∈ K_t ← GETACTIVATENEWFILTERSTATES()
4      {{z_t^{(k,n)}}_n}_k ← PREDICTPOSE({{z_{t-L:t-1}^{(k,n)}}_{n-1}}_k)
       // (2) Pose Estimation
5      {x_t^{(j)}}_{j=1}^{C_t} ← ESTIMATEPOSESFROMCURRENTFRAME()
       // (3) Greedy Matching
6      {{{d_{OKS}^{(j,k,n)}}_j}_k}_n ← CALCOKS({{z_t^{(k,n)}}_n}_k, {x_t^{(j)}}_j)
7      {{d_{score}^{(j,k)}}_j}_k ← CALCSCORE({{{d_{OKS}^{(j,k,n)}}_j}_k}_n)
8      ({j'_k}_k, {k'_j}_j) ← BIPARTITEMATCH({{d_{score}^{(j,k)}}_j}_k)
9      for j ← 1 to C_i do
10         if k'_j > −1 then
11             OUTPUT(x_t^{(j)}, k'_j)
12         else
13             k_new ← ACTIVATENEWFILTER()
14             l_k ← 1
15             {z_t^{(k_new,n)}}_n ← {x_t^{(j)}}_n
16             {z_{t-L|1:t-1}^{(k_new,n)}}_n ← 0
17             OUTPUT(x_t^{(j)}, k_new)
       // (4) Particle Update
18     foreach Active Filters k ∈ K_t do
19         {{z_{t-L+1:t}^{(k,n)}}_n}_k ← PUSH({{z_t^{(k,n)}}}, {{z_{t-L:t-1}^{(k,n)}}})
20         if j'_k > −1 then
21             {z_{t-L+1:t}^{(k,n)}}_n ←
                   RESAMPLEANDSELECT({z_{t-L+1:t}^{(k,n)}}_n, x_{t-L+1:t}^{(j'_k)})
22             l_k ← Min(l_k+1, 30)
23         else
24             l_k ← l_k − 1
25             if l_k < 0 then
26                 DEACTIVATEFILTER(K)
```

FIG. 11

| Method | MOTA Head | MOTA Sho. | MOTA Elb. | MOTA Wri. | MOTA Hip | MOTA Knee | MOTA Ank. | MOTA Total |
|---|---|---|---|---|---|---|---|---|
| Reference example 1 | 50.9 | 55.5 | 65.0 | 49.0 | 48.7 | 50.5 | 45.1 | 50.6 |
| Reference example 2 | 61.7 | 65.5 | 57.3 | 45.7 | 54.3 | 53.1 | 45.7 | 55.2 |
| Reference example 3 | 59.8 | 67.0 | 59.8 | 51.6 | 60.0 | 58.4 | 50.5 | 58.3 |
| Reference example 4 | - | - | - | - | - | - | - | 60.9 |
| Comparative example | 73.9 | 75.9 | 63.7 | 56.1 | 65.5 | 65.1 | 53.6 | 65.4 |
| Reference example 5 | 76.0 | 76.9 | 66.1 | 56.4 | 65.1 | 61.6 | 52.4 | 65.7 |
| Present disclosure | 72.5 | 76.5 | 66.8 | 58.6 | 63.2 | 65.2 | 57.0 | 66.2 |

FIG. 12

| Method | H.A. Uncertainty | E. Uncertainty | Time | MOTA | num_switches |
|---|---|---|---|---|---|
| Present disclosure | ✓ | ✓ | 15 | 66.1 | 232 |
| Present disclosure | ✓ | ✓ | 10 | 66.2 | 213 |
| Present disclosure | ✓ | ✓ | 7 | 66.1 | 242 |
| Present disclosure | ✓ | | 3 | 66.0 | 266 |
| Present disclosure | | ✓ | 10 | 66.1 | 252 |
| Present disclosure | | ✓ | 10 | 66.0 | 285 |
| Present disclosure | | | 10 | 65.9 | 303 |
| Comparative example | - | - | - | 65.4 | 407 |

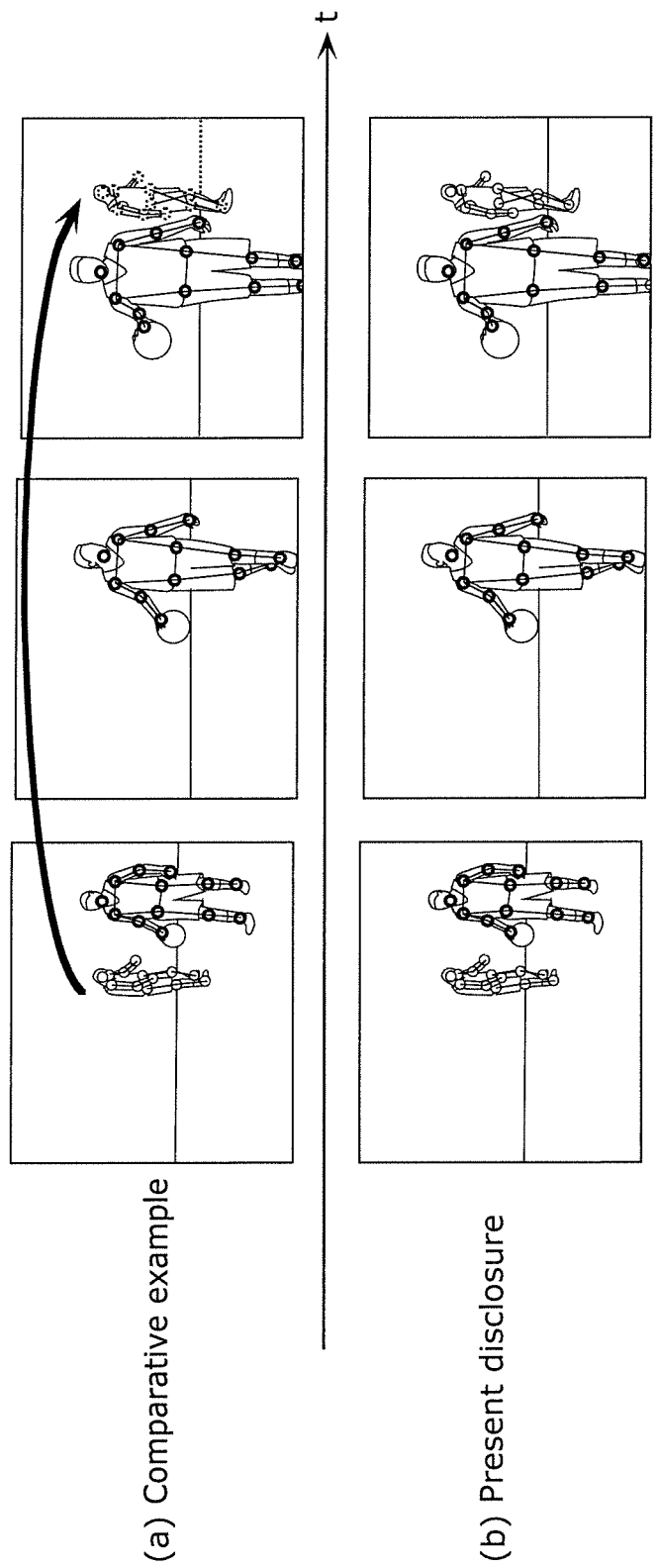

OBJECT TRACKING METHOD AND RECORDING MEDIUM

CROSS REFERENCE TO RELATED APPLICATION

The present application is based on and claims priority of Japanese Patent Application No. 2020-052978 filed on Mar. 24, 2020 and U.S. Provisional Patent Application No. 62/899,818 filed on Sep. 13, 2019. The entire disclosures of the above-identified applications, including the specifications, drawings and claims are incorporated herein by reference in its entirety.

FIELD

One or more exemplary embodiments disclosed herein relate generally to an object tracking method and a recording medium.

BACKGROUND

A pose tracking technique of tracking poses of multiple persons in a video has gathered an attention among object tracking techniques of tracking a plurality of objects shown in a video. In the pose tracking technique, a two-stage scheme is employed in many cases (see NPL 1). The two-stage scheme has the following two stages: (1) estimate poses for each frame using a deep convolutional neural network (CNN); and (2) perform greedy bipartite matching on a per frame basis.

In the pose tracking technique disclosed in NPL 1, a pose is estimated from a current frame of an input video, and coordinates presenting a pose in a previous frame are shifted based on optical-flows and the pose in the previous frame to predict a pose in the current frame. Subsequently, matching is performed between the pose estimated from the current frame and the pose predicted from, for instance, the previous frame, and an identical ID is assigned to a matched pair. Note that object keypoint similarity (OKS) between the estimated pose and the predicted pose is used for the matching.

CITATION LIST

Non Patent Literature

NPL 1: B. Xiao, H. Wu, and Y. Wei, "Simple baselines for human pose estimation and tracking" in European Conference on Computer Vision, 2018.

SUMMARY

Technical Problem

The problem, however, is that the pose tracking technique disclosed in NPL 1 is vulnerable to errors in pose prediction. For example, during the pose tracking of multiple persons in a video, disturbance such as fast pose changing, or disappearances or reappearances of poses by occlusions may occur. With the pose tracking technique disclosed in NPL 1, a pose might be erroneously estimated from a current frame when such disturbance occurs, resulting in mismatching between the pose estimated from the current frame and a pose predicted from, for instance, a previous frame. In other words, there is a risk of performing erroneous pose tracking, i.e., making tracking errors when disturbance occurs.

One non-limiting and exemplary embodiment provides an object tracking method and a recording medium that are capable of reducing tracking errors.

Solution to Problem

In one general aspect, the techniques disclosed here feature an object tracking method performed by a computer for tracking an object in a video. The object tracking method includes: predicting, by a pose predictor, a prediction distribution by inputting pose time-sequence data to the pose predictor, the pose predictor including a first neural network and performing pose prediction which takes uncertainty into consideration, the prediction distribution being a distribution of each of prediction pose locations of one or more first objects in a current frame, the pose time-sequence data including coordinates indicating a pose of each of the one or more first objects in at least two previous frames in time sequence; estimating, by a second neural network, a set of locations of each of one or more second objects in the current frame by inputting the current frame to the second neural network; obtaining identification information and location information by matching the set of locations and the prediction distribution, to output the identification information and location information obtained, the identification information indicating a one-to-one correspondence between the one or more second objects and the one or more first objects, the location information indicating a location of a pose of each of the one or more second objects; and updating the pose time-sequence data by adding, to the pose time-sequence data, data including coordinates indicating a pose of each of the one or more first objects based on the identification information and the location information obtained in the obtaining, the data being obtained from the prediction distribution predicted in the predicting.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effect

The object tracking method and so on according to one or more exemplary embodiments or features disclosed herein provide reduction of tracking errors.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 is a diagram illustrating an example of pseudo codes used for an object tracking method according to Example 2.

FIG. 11 is a diagram illustrating the results of evaluation on object tracking performance according to Example 3.

FIG. 12 is a diagram illustrating the results of performance evaluation experiment in the case of inactivating the components of a pose predictor according to Example 3.

FIG. 14 is a diagram visually illustrating results of object tracking based on the object tracking method according to the present disclosure and results of object tracking based on the object tracking method according to the comparative example.

DESCRIPTION OF EMBODIMENT

Figure 1:
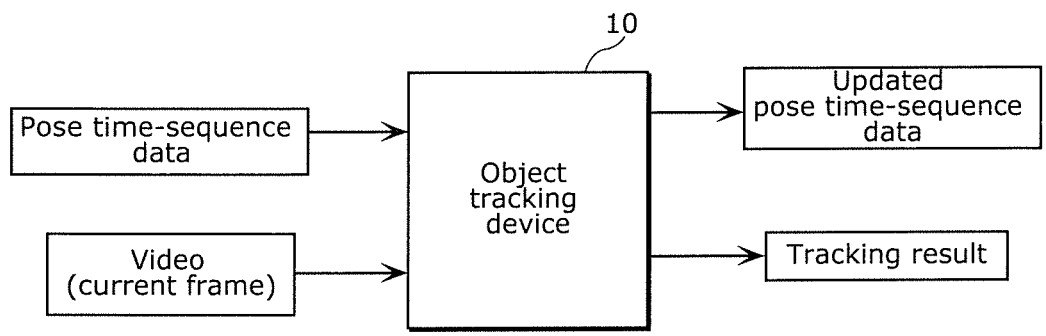
FIG. 1 is a diagram illustrating an object tracking device according to an embodiment.

According to an exemplary embodiment disclosed herein, an object tracking method includes: predicting, by a pose predictor, a prediction distribution by inputting pose time-sequence data to the pose predictor, the pose predictor including a first neural network and performing pose prediction which takes uncertainty into consideration, the prediction distribution being a distribution of each of prediction pose locations of one or more first objects in a current frame, the pose time-sequence data including coordinates indicating a pose of each of the one or more first objects in at least two previous frames in time sequence; estimating, by a second neural network, a set of locations of each of one or more second objects in the current frame by inputting the current frame to the second neural network; obtaining identification information and location information by matching the set of locations and the prediction distribution, to output the identification information and location information obtained, the identification information indicating a one-to-one correspondence between the one or more second objects and the one or more first objects, the location information indicating a location of a pose of each of the one or more second objects; and updating the pose time-sequence data by adding, to the pose time-sequence data, data including coordinates indicating a pose of each of the one or more first objects based on the identification information and the location information obtained in the obtaining, the data being obtained from the prediction distribution predicted in the predicting.

In this way, it is possible to realize an object tracking method capable of reducing tracking errors.

For example, in the obtaining, the matching may be performed to calculate a pair of the prediction distribution and the set of the locations, the pair attaining a matching score that is at least a predetermined value, and the identification information and the location information may be obtained based on the pair calculated and be output.

For example, in the obtaining, the matching performed to calculate the pair may be bipartite matching.

For example, in the predicting, the first neural network may predict the prediction distribution using one or more models for taking the uncertainty into consideration, by causing each of the one or more models to predict the prediction pose locations from the pose time-sequence data.

For example, the prediction distribution may take the uncertainty into consideration, include the prediction pose locations predicted, and be expressed by dispersion of a Gaussian distribution.

For example, the first neural network may include a recurrent neural network and a predetermined neural network that creates the one or more models.

For example, the one or more models may be created by applying dropout to the predetermined neural network and inactivating one or more nodes constituting the predetermined neural network.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended Claims and their equivalents. Therefore, among the elements in the following exemplary embodiment, those not recited in any one of the independent claims are described as optional elements.

Embodiment

The following describes an object tracking method employed by object tracking device 10 and so on according to an embodiment.

[Object Tracking Device 10]

FIG. 1 is a diagram illustrating object tracking device 10 according to this embodiment.

A video, i.e., a current frame from the video, showing one or more objects to be tracked is input together with pose time-sequence data to object tracking device 10 according to this embodiment. Object tracking device 10 outputs results obtained by tracking one or more objects in the current frame. The results include identification information of one or more objects and location information indicating the locations of poses of one or more objects. Object tracking device 10 also outputs pose time-sequence data that has been updated. The pose time-sequence data includes coordinates indicating a pose of each of one or more objects shown in at least two previous frames in time sequence, which will be described later. Subsequently, when the next current frame is input together with the updated pose time-sequence data, object tracking device 10 outputs a tracking result in the same manner as described above. Thus, object tracking device 10 tracks the poses of one or more objects in an input video. Although the following describes an example in which a person is an example of an object to be tracked, the example is not limited to this. An example of the object may be a vertebrate animal having a posture, or may be anything such as a living object or an object provided that keypoints, which are to be mentioned later, can be detected.

[Hardware Configuration]

Figure 2:
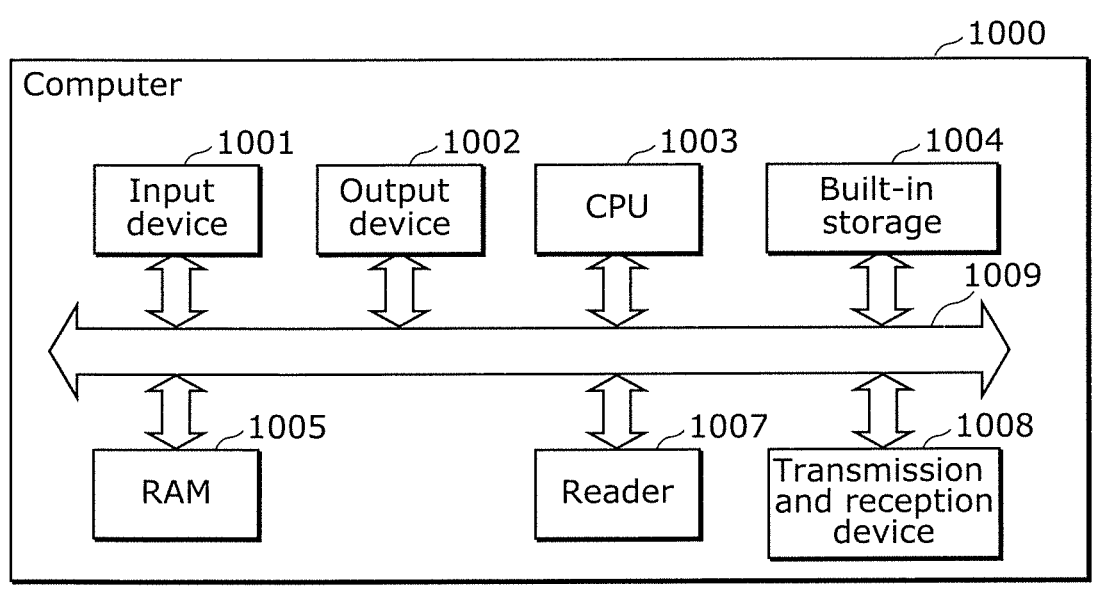
FIG. 2 is a diagram illustrating an example of a hardware configuration of a computer that realizes, by software, the functions of the object tracking device according to the embodiment.

The following describes, with reference to FIG. 2, a hardware configuration of object tracking device 10 according to this embodiment. FIG. 2 is a diagram illustrating an example of a hardware configuration of computer 1000 that realizes, by software, the functions of object tracking device 10 according to the embodiment.

Computer 1000 includes input device 1001, output device 1002, CPU 1003, built-in storage 1004, RAM 1005, reader 1007, transceiver 1008, and bus 1009, as illustrated in FIG. 2. Input device 1001, output device 1002, CPU 1003, built-in storage 1004, RAM 1005, reader 1007, and transceiver 1008 are connected to one another via bus 109.

Input device 1001 serves as a user interface such as an input button, a touch pad, and a touch panel display, and receives user's operations. Input device 1001 may be configured to receive, besides user's touching operations, voice operations, remote operations transmitted using a remote controller.

Built-in storage 1004 is, for instance, a flash memory. Built-in storage 1004 may previously store at least one of a program for realizing the functions of object tracking device 10 or an application utilizing the functional configuration of object tracking device 10.

RAM 1005 is a random access memory used for storing, for instance, data when executing a program or an application.

Reader 1007 reads information from a recording medium such as a universal serial bus (USB) memory. Reader 1007 reads a program or application as described above from a recording medium on which the program or application is recorded, and store the program or application into built-in storage 1004.

Transceiver 1008 is a communication circuit for wireless or wired communications. Transceiver 1008 communicates, for example, with a server device connected to a network, and downloads and stores the aforementioned program or application in built-in storage 1004.

CPU 1003 is a central processing unit (CPU), copies a program or application stored in built-in storage 1004 to RAM 1005, and sequentially reads out and executes instructions included in the program or application.

[Configuration of Object Tracking Device 10]

Next, a configuration of object tracking device 10 according to this embodiment will be described.

Figure 3:
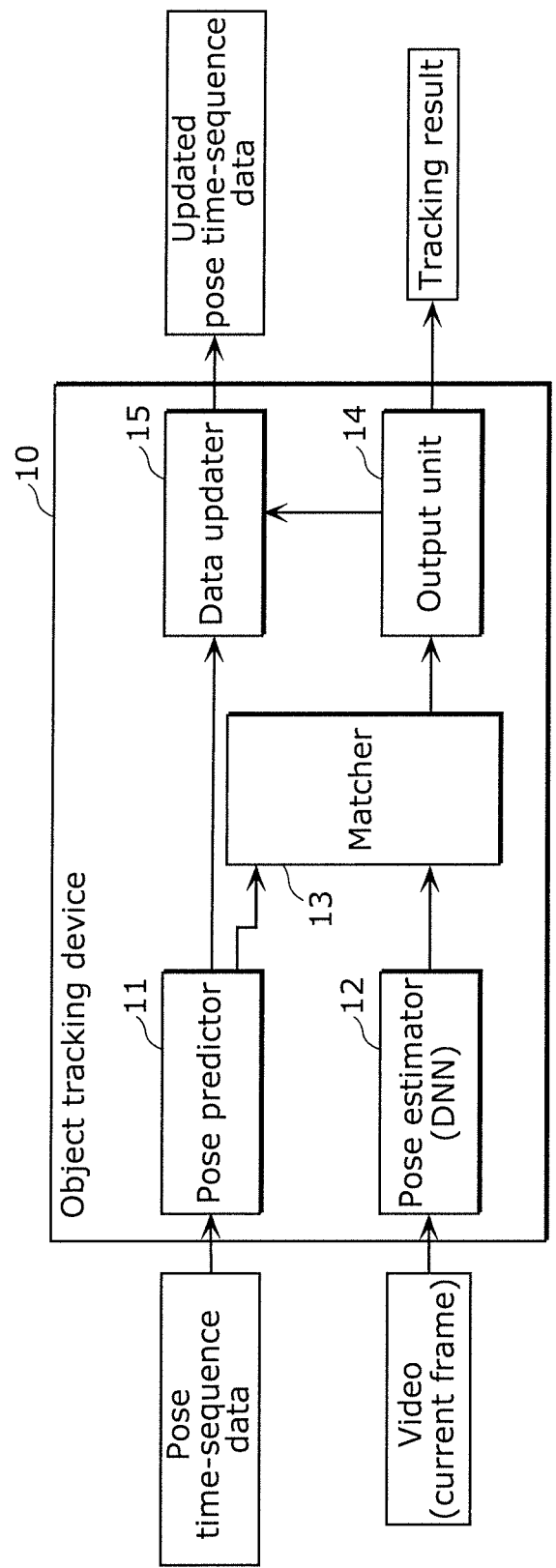
FIG. 3 is a block diagram illustrating an example of a configuration of the object tracking device according to the embodiment.

FIG. 3 is a block diagram illustrating an example of the configuration of object tracking device 10 according to this embodiment.

Object tracking device 10 tracks the poses of one or more objects shown in an input video. In this embodiment, object tracking device 10 includes pose predictor 11, pose estimator 12, matcher 13, output unit 14, and data updater 15, as illustrated in FIG. 3. The following describes in more detail each of the elements included in object tracking device 10.

<Pose Predictor 11>

Pose predictor 11 is configured with an architecture including a first neural network, and performs pose prediction that takes uncertainty into consideration.

The architecture will be described later in greater detail. Upon receiving pose time-sequence data including coordinates indicating a pose of each of one or more objects shown in at least two previous frames in time sequence, pose predictor 11 predicts a prediction distribution which is a distribution of each of prediction pose locations of one or more first objects in a current frame. The prediction distribution predicted by pose predictor 11 is a distribution that takes into consideration at least one of two kinds of uncertainties which are to be mentioned later, includes the prediction pose locations predicted, and is expressed by dispersion in a Gaussian distribution. The pose time-sequence data may include not only the coordinates, but also identifiers (IDs) for identifying one or more objects.

In this embodiment, a human pose as an object in a frame is predicted as a set of locations of joints of a person in the frame. The joints are, for example, head, shoulders, elbows, and wrists, and are referred to as keypoints. The pose time-sequence data is held in a data structure referred to as queues, and is input to pose predictor 11 by data updater 15 which is to be mentioned later.

Pose predictor 11 predicts, from the pose time-sequence data, whereabouts of each of the locations, in the current frame, of keypoints constituting a pose of each of one or more persons in the current frame using a distribution (i.e., distribution of each of the locations of the keypoints). Such a distribution of each of the locations of the keypoints is equivalent to the aforementioned prediction distribution. Thus, pose predictor 11 does not predict where (one hypothesis) each location of the keypoints is in the current frame, but predicts the whereabouts (multiple hypotheses if stated differently) of the location in the form of a distribution (i.e., prediction distribution).

<Pose Estimator 12>

Upon receiving a current frame, pose estimator 12 estimates a set of locations of each of zero or more second objects shown in the current frame. It may be defined that when no object is shown in the current frame, this means that no output is performed, namely, pose estimator 12 does not perform estimation.

In this embodiment, an RGB image presenting a current frame is input to pose estimator 12, and pose estimator 12 estimates a set of locations of the keypoints constituting a pose of each of one or more persons shown in the current frame. Pose estimator 12, however, does not go beyond the capability of estimating the presence of some kind of a human pose in the current frame. In other words, although a pose of a person in the current frame is estimated by pose estimator 12, it is not possible to know who the person is (an ID is not assigned to the person).

Moreover, pose estimator 12 is configured with an architecture including a second neural network. Pose estimator 12 then inputs the current frame obtained from the video to the second neural network to estimate a set of locations of each of one or more second objects shown in the current frame. In this embodiment, the second neural network is defined as the deep CNN disclosed in NPL 1. The second neural network may by any deep neural network (DNN) as long as the network is capable of estimating, from a current frame, a set of locations of keypoints constituting a pose of each of one or more persons shown in the current frame.

<Matcher 13>

Matcher 13 performs matching between the set of locations of each of one or more second objects estimated by pose estimator 12 and the prediction distribution predicted by pose predictor 11. Matcher 13 obtains, through the matching, identification information indicating a one-to-one correspondence between one or more second objects and one or more first objects and location information which is coordinates indicating a pose of each of one or more second objects, and outputs the obtained identification information and location information. More specifically, matcher 13 calculates, through the matching, a pair of prediction distribution and a set of locations whose matching score is at least a predetermined value, obtains identification information and location information based on the calculated pair, and outputs the obtained identification information and location information. The matching performed to calculate the pair may be bipartite matching.

In this embodiment, matcher 13 performs, using object keypoint similarity (OKS), bipartite matching between a distribution of the locations of the keypoints which is predicted by pose predictor 11 and a set of locations of keypoints which is estimated by pose estimator 12. The OKS is used as an evaluation index indicating a similarity between an estimated pose and a correct pose. The OKS is a value indicating an average of similarity between an estimated pose and a correct pose regarding joint points annotated, and indicates a value 1 when the estimated pose perfectly matches the correct pose. The bipartite matching is also referred to as bipartite graph matching and is a method for deriving multiple pairs that are valid pairs between two categories each including a plurality of elements.

To be more specific, matcher 13 calculates, using the OKS, a matching score for all kinds of pairs, each of which is a pair of a distribution of locations of keypoints predicted by pose predictor 11 and a set of locations of keypoints estimated by pose estimator 12. Matcher 13 obtains, as a valid pair among other pairs, a pair attaining a matching score that is at least a threshold value. The pair attaining such a matching score is a pair of locations of keypoints in the distribution predicted by pose predictor 11 and locations in the set of locations estimated by pose estimator 12.

Matcher 13 obtains location information indicating the estimated poses of one or more persons shown in the current frame, and also assigns an ID to each person whose pose has been estimated, based on the obtained pair. The location information indicating a pose of each of one or more persons is, for example, location coordinates indicating a plurality of keypoints constituting a pose of each of one or more persons. The information relating to an ID assigned to a person whose pose has been estimated is equivalent to the aforementioned identification information.

Matcher 13 then outputs the obtained location information and identification information to output unit 14.

<Output Unit 14>

Output unit 14 feeds back the location information and identification information output from matcher 13 to the current frame, and outputs the frame as a tracking result. Output unit 14 also outputs the location information and identification information output from matcher 13 to data updater 15.

<Data Updater 15>

Based on the identification information and location information obtained, data updater 15 adds, to the pose time-sequence data, data which includes the coordinates indicating the pose of each of one or more first objects and is obtained from the prediction distribution predicted by pose predictor 11, to update the pose time-sequence data.

In this embodiment, data updater 15 adds, to the pose time-sequence data and based on the result of matching performed by matcher 13, only coordinates with high probability in the prediction distribution predicted by pose predictor 11. The pose time-sequence data is held in a data structure referred to as queues, as described above. Therefore, data updater 15 adds (pushes) only coordinates with high probability in the prediction distribution to the pose time-sequence data so that the oldest pose time-sequence data is deleted and the pose time-sequence data is thus updated.

More specifically, data updater 15 may update the pose time-sequence data using a particle filter. The particle filter is also referred to as Sequential Monte Carlo (SMC) and is a method of predicting time-sequence data based on a probability distribution. The particle filter is understood as a base filter of a version similar to the SMC. Here, particles are regarded as one pose consisting of a set of keypoints. Accordingly, when using a particle filter, data updater 15 is merely required to update a queue storing time-sequence data according to a matching score calculated using bipartite matching to perform resampling. Data updater 15 is thus capable of updating pose time-sequence data.

[Detailed Configuration of Pose Predictor 11 etc.]

The following describes a detailed configuration of pose predictor 11.

Figure 4:
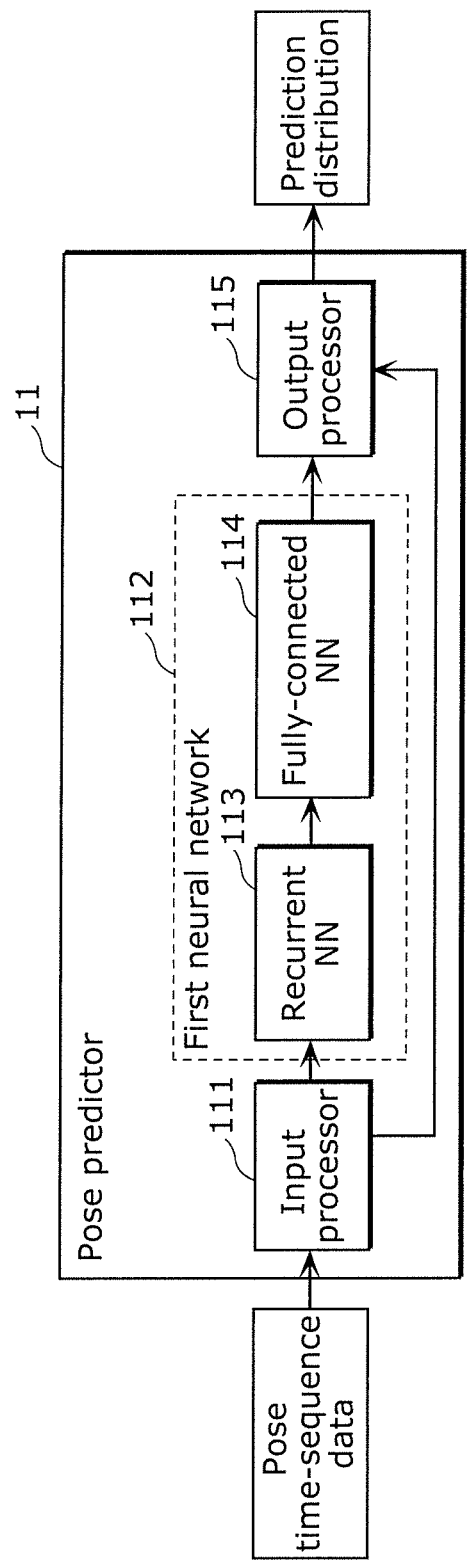
FIG. 4 is a block diagram illustrating an example of a detailed configuration of a pose predictor illustrated in FIG. 3.
Figure 5:
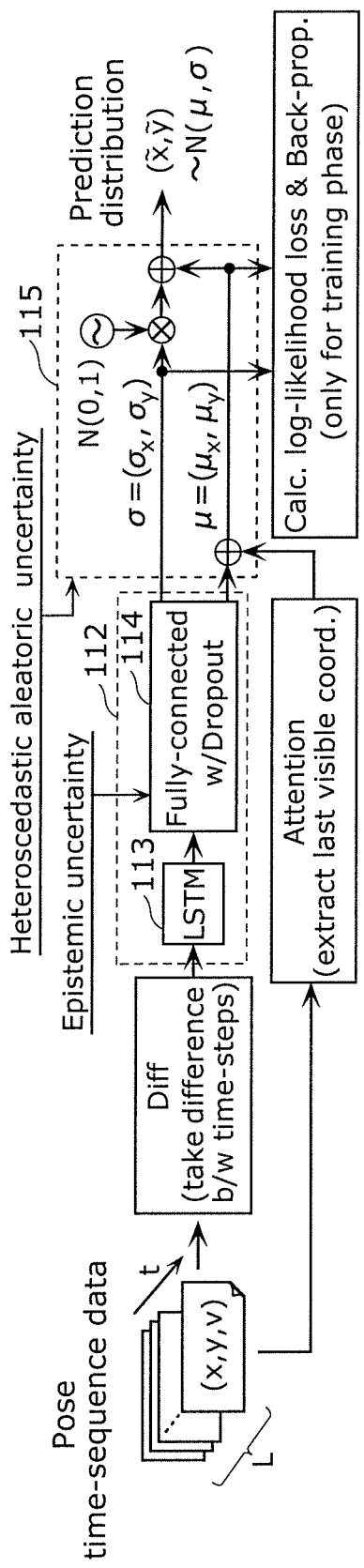
FIG. 5 is a diagram illustrating an example of architecture of the pose predictor illustrated in FIG. 3.

FIG. 4 is a block diagram illustrating an example of a detailed configuration of pose predictor 11 illustrated in FIG. 3. FIG. 5 is a diagram illustrating an example of architecture of pose predictor 11 illustrated in FIG. 3. FIG. 5 also illustrates that error function calculation based on error back propagation and log-likelihood is performed only when first neural network 112 is trained.

Pose predictor 11 is configured with an architecture including first neural network 112, as described above, and performs pose prediction that takes uncertainty into consideration to predict, using a pose distribution, whereabouts of each of the locations of the keypoints constituting a pose of a person in a current frame.

In this embodiment, by involving two kinds of uncertainties, pose predictor 11 is capable of predicting, with the use of a pose distribution, various poses (also referred to as multiple hypotheses) having probabilistic behaviors. The two kinds of uncertainties are epistemic uncertainty and heteroscedastic aleatoric uncertainty.

The epistemic uncertainty accounts for uncertainty due to lack of knowledge or information regarding models and parameters used for the models, and is also referred to as "model uncerntainty". When an inference is made using DNN, epistemic uncertainty means uncertainty due to a difference between training models which is attributable to lack of training data. Such epistemic uncertainty is improved by a sufficient amount of training data.

Aleatoric uncertainty is caused by a difference or a change, that is, noise inherent in observations, and is thus incidental uncertainty due to observation errors or disturbance. When pose prediction is performed, this uncertainty could be originated from a sudden change of human gaits, fast camera panning and tilting, or errors in pose estimation using a deep CNN model. No matter how much we train the model, improvement in aleatoric uncertainty cannot be attained. Heteroscedastic aleatoric uncertainty occurs when an amount of noise inherent in observations varies depending on an input.

In this embodiment, pose predictor 11 includes input processor 111, first neural network 112, and output processor 115, as illustrated in FIG. 4.

<Input Processor 11>

Input processor 111 extracts, from pose time-sequence data that is input from pose predictor 11, coordinates indicating a pose of each of one or more persons shown in previous frames included in frames captured per predetermined time equivalent to, for example, ten frames, and a visible flag indicating whether the coordinates are visible in the previous frames.

In the example illustrated in FIG. 5, input processor 111 extracts, from the pose time-sequence data input by pose predictor 11, the location coordinates of a set of keypoints constituting a pose in each of the previous frames a total number of which is included in parameter L indicating time length, and calculates a difference in time direction. Input processor 111 outputs the calculated difference to first neural network 112.

<First Neural Network 112>

With the use of one or more models for taking uncerntainty into consideration, first neural network 112 causes each of the models to predict, from pose time-sequence data, the prediction pose locations of one or more first objects in a current frame, to predict a prediction distribution. First neural network 112 includes a recurrent neural network and a predetermined neural network that creates one or more models. One or more models are created by applying dropout to the predetermined neural network and inactivating one or more nodes constituting the predetermined neural network.

In this embodiment, first neural network 112 includes recurrent neural network (NN) 113 and fully-connected neural network (NN) 114, as illustrated in FIG. 4.

Recurrent NN 113 is a neural network that has a recurrent connection by which an output from a certain layer is retrospectively input, and allows handling of time-sequence data having a value that varies with the elapse of time. Recurrent NN 113 may be, for example, a long short-term memory (LSTM). Recurrent NN 113 is not limited to an LSTM and may be a gated recurrent unit (GRU) or a quasi-recurrent neural network (QRNN).

The LSTM is a model capable of training long-term time-sequence data, and a short-term memory in a network can be utilized for a long term. The GRU is a model having an architecture that is simpler than that of LSTM, and like LSTM, is capable of training long-term time-sequence data. The QRNN is a model obtained by modeling an RNN scheme using a CNN, and is also understood as an algorithm promoting high-speed LSTM.

In the example shown in FIG. 5, recurrent NN 113 includes an LSTM including 64 units.

Fully-connected NN 114 is a neural network including fully-connected layers and is also referred to as a feed forward neural network. Fully-connected NN 114 includes an input layer, several intermediate layers, and an output layer, and all of the intermediate layers are fully-connected layers. Fully connected NN 114 applies dropout or ensembles to output, in the form of a distribution, multiple hypotheses (various poses) with consideration given to epistemic uncertainty.

Dropout is a method for promoting training while inactivating (disabling) certain nodes in a neural network. In this embodiment, dropout is applied to fully-connected NN 114 for epistemic uncertainty modeling. With this, it is possible to handle, as one model, fully-connected NN 114 when part of the intermediate layers is inactive. In other words, fully-connected NN 114 is capable of utilizing dropout and randomly inactivating part of the intermediate layers to output one pose prediction for each model while probabilistically sampling one or more models (also referred to as probabilistic models) that are mutually different. Fully-connected NN 114 then approximates the result of pose prediction to a Gaussian distribution to output the result.

In this way, fully-connected NN 114 is capable of approximating multiple poses obtained from probabilistic models to a Gaussian distribution to output the resulting distribution as a prediction result. Note that a Gaussian distribution is one example and a pose prediction result may be approximated using a categorical distribution, or a triangle distribution or a Cauchy distribution.

In the example shown in FIG. 5, fully-connected NN 114 includes, for example, 40 intermediate layers, i.e., hidden nodes, and, for example, Leaky-ReLU is used as an activation function of hidden nodes. Moreover, the dropout probability of the hidden nodes is defined as 0.3. Thus, fully-connected NN 114 is capable of modeling epistemic uncertainty by utilizing dropout at the time of prediction. The number of hidden nodes is not limited to 40 and the activation function of hidden nodes is not limited to Leaky-ReLU. The dropout probability is not limited to 0.3 and any value can be set where necessary.

Although FIG. 5 illustrates an example that fully-connected NN 114 utilizes dropout at the time of prediction, but the example is not limited to this and ensembles may be used instead. In that case, fully-connected NN 114 includes one or more models, and a result obtained by merging pose prediction results obtained from one or more models may be approximated to, for example, a Gaussian distribution and then output.

As described above, fully-connected NN 114 is capable of outputting multiple hypotheses (multiple predicted poses) from one result (input) that is output from LSTM 113 since various models are probabilistically sampled, and outputs the hypotheses in the form of a distribution (i.e., prediction distribution) to output processor 115.

<Output Processor 115>

Output processor 115 generates multiple hypotheses (multiple predicted poses) based on the distribution (the aforementioned prediction distribution) output from first neural network 112. Output processor 115 then outputs, as a prediction distribution output by pose predictor 11, a distribution including the distribution output from first neural network 112 and the generated multiple hypotheses to matcher 13 and data updater 15.

In this embodiment, it is possible to model heteroscedastic aleatoric uncerntainty by adding dispersion to the output (the aforementioned prediction distribution) from first neural network 112 to cause output processor 115 to output the resulting distribution.

More specifically, output processor 115 outputs, as the prediction distribution output by pose predictor 11, the distribution including the distribution output from first neural network 112 and the generated multiple hypotheses in the form of an output from first neural network 112, with dispersion being added. This enables output processor 115 to output the prediction distribution output by pose predictor 11 in a form that can be handled as particles constituting a sample set of a particle filter.

In the example illustrated in FIG. 5, multiple values, i.e., multiple hypotheses, are calculated by averaging the Gaussian distribution output from first neural network 112 and multiplying each of the resulting values with a random number. Output processor 115 also calculates variance values from values obtained by adding the Gaussian distribution output from first neural network 112 to the coordinates indicating the latest visible keypoints that are extracted from the pose time-sequence data. Output processor 115 then outputs, as a prediction distribution, the Gaussian distribution obtained by adding the calculated multiple values to the calculated variance values. In FIG. 5, σ denotes the averaged Gaussian distribution, μ denotes variance, and N (0, 1) denotes a reference Gaussian distribution.

Thus, output processor 115 outputs the Gaussian distribution that is dependent on the output from first neural network 112 while adaptively changing diversity in particles, i.e., variance values, according to the conditions. Note that a Gaussian distribution is one example and multiple hypotheses may be approximated using a categorical distribution, or a triangle distribution or a Cauchy distribution.

When a person shown in a video moves very fast, for example, output processor 115 outputs a Gaussian distribution expressing that particles are spread in a wider area. In contrast, when a person shown in a video moves slowly, output processor 15 outputs a Gaussian distribution expressing that particles are concentrated in a narrower area. Such operation is helpful for effective use of finite particles used for the sample set of a particle filter.

Example 1

Embodiment 1 describes the case of obtaining a pose prediction result by predicting a prediction distribution for a current frame using pose predictor 11 illustrated in FIG. 5 and the case, as a comparative example, of obtaining a pose estimation result by estimating a pose in a current frame using the pose tracking technique disclosed in NPL 1. Hereinafter, the pose tracking technique disclosed in NPL 1 is also referred to as optical-flow based pose estimation.

Figure 6A:
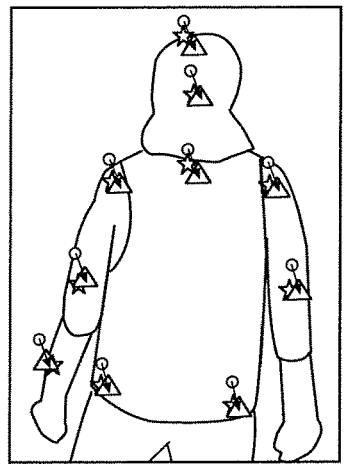
FIG. 6A is a diagram illustrating a result of pose estimation for a current frame according to a comparative example.
Figure 6B:
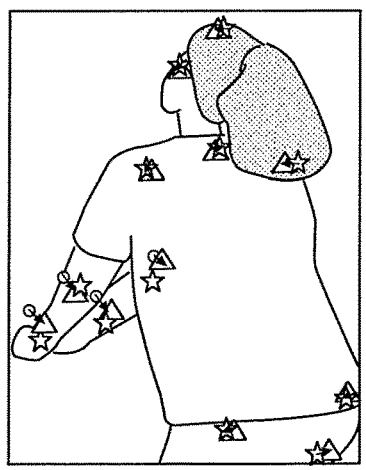
FIG. 6B is a diagram illustrating a result of pose estimation for a current frame according to the comparative example.
Figure 6C:
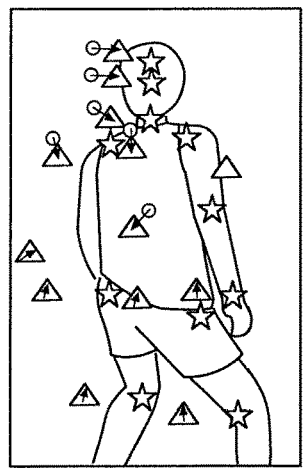
FIG. 6C is a diagram illustrating a result of pose estimation for a current frame according to the comparative example.
Figure 7A:
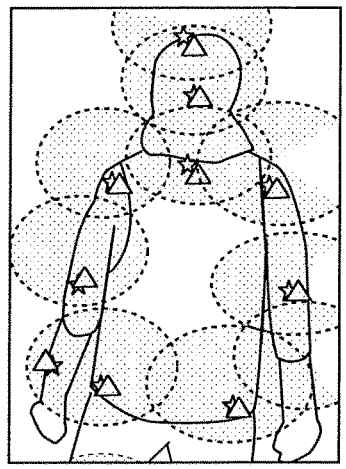
FIG. 7A is a diagram illustrating a result of pose prediction for a current frame according to Example 1.
Figure 7B:
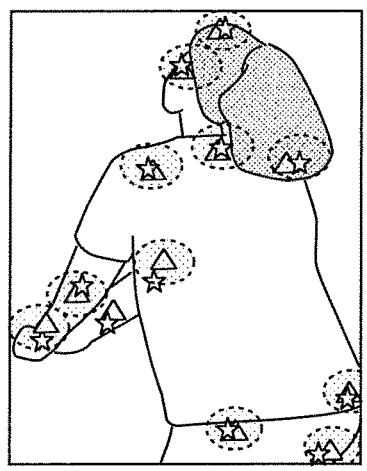
FIG. 7B is a diagram illustrating a result of pose prediction for a current frame according to Example 1.
Figure 7C:
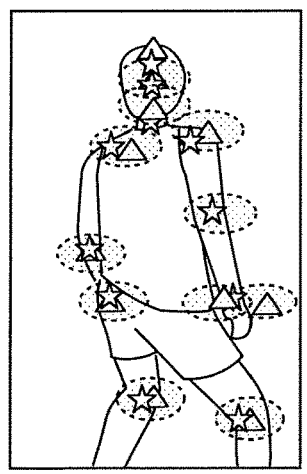
FIG. 7C is a diagram illustrating a result of pose prediction for a current frame according to Example 1.

FIG. 6A through FIG. 6C are each a diagram illustrating a result of pose estimation for a current frame according to the comparative example. FIG. 7A through FIG. 7C are each a diagram illustrating a result of pose prediction for a current frame according to Embodiment 1. FIG. 6A and FIG. 7A, FIG. 6B and FIG. 7B, and FIG. 8A and FIG. 8B each illustrate a pose estimation result and a pose prediction result respectively obtained for a same current frame. In FIG. 6A through FIG. 6C, circles denote locations of keypoints estimated for a previous frame, triangles denote locations of keypoints estimated for a current frame, and star marks denote locations of true (i.e., correct) keypoints in the current frame. In contrast, in FIG. 7A through FIG. 7C, a region enclosed by a dotted line denotes a distribution of each of the locations of the keypoints predicted for the current frame (i.e., the aforementioned prediction distribution), a triangle denotes an average location in a prediction distribution, and star marks denote the locations of true (i.e., correct) keypoints in the current frame.

The locations of true keypoints relatively match the locations of the keypoints estimated for a person with less movement, and a highly reliable pose estimation result is obtained, as illustrated in FIG. 6A. In contrast, the locations of true keypoints are distant from the locations of the keypoints estimated for a portion of the body that moves fast or a person who moves fast, as illustrated in FIG. 6B and FIG. 6C, and a less reliable pose estimation result is obtained.

On the other hand, when predicting a prediction distribution for a current frame with consideration given to two uncertainties, using pose predictor 11 illustrated in FIG. 5, each of the locations of true keypoints is included in the corresponding prediction distribution indicated as a dotted region, as illustrated in FIG. 7A through FIG. 7C. Furthermore, since the locations of true keypoints relatively match the average locations in the prediction distribution, a highly reliable pose prediction result is obtained.

[Operations Performed by Object Tracking Device 10 Etc.]

Next, operations performed by object tracking device 10 and so on having the configuration as described above will be described.

Figure 8:
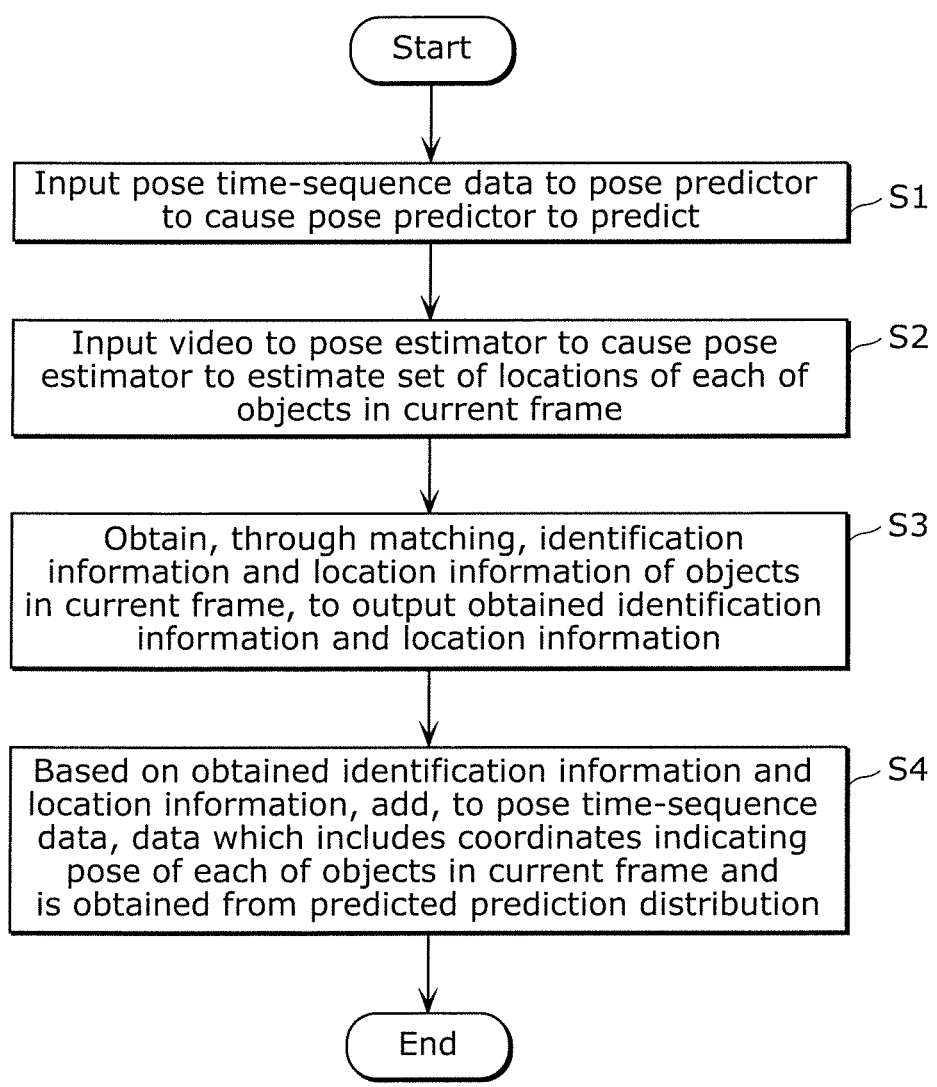
FIG. 8 is a flowchart illustrating operations performed by an object tracking device according to the embodiment.

FIG. 8 is a flowchart illustrating an example of the operations performed by object tracking device 10 according to this embodiment.

First, object tracking device 10 inputs pose time-sequence data to cause pose predictor 11 to predict a prediction distribution for a current frame (S1). More specifically, object tracking device 10 inputs pose time-sequence data to pose predictor 11 that includes a first neural network and performs pose prediction that takes uncertainty into consideration, to cause pose predictor 11 to predict a prediction distribution which is a distribution of each of prediction pose locations of one or more first objects in the current frame. The pose time-sequence data includes coordinates indicating a pose of each of one or more objects shown in two previous frames in time sequence in a video input to pose estimator 12. In this embodiment, an object to be tracked is a person.

Subsequently, object tracking device 10 inputs a video to cause pose estimator 12 to estimate a set of locations of each of objects in the current frame (S2). More specifically, object tracking device 10 inputs an RGB image indicating the current frame to a second neural network configuring pose estimator 12 to cause the second neural network to estimate a set of locations of each of one or more second objects in the current frame.

Subsequently, object tracking device 10 obtains, through matching, identification information and location information of one or more objects in the current frame, to output the obtained identification information and location information (S3). More specifically, object tracking device 10 performs matching between the set of locations estimated in step S2 and the prediction distribution predicted in step S1. Object tracking device 10 thus obtains identification information indicating a one-to-one correspondence between one or more second objects and one or more first objects and location information which is coordinates indicating a pose of each of one or more second objects. In this embodiment, object tracking device 10 uses bipartite matching for the matching. The identification information of one or more objects in the current frame relates to IDs assigned to one or more objects. The location information of one or more objects in the current frame is location coordinates indicating keypoints constituting a pose of each of one or more objects in the current frame.

Based on the identification information and the location information obtained in step S3, object tracking device 10 adds, to the pose time-sequence data, data which is obtained from the prediction distribution predicted in step S1 and includes coordinates indicating a pose of each of one of more objects in the current frame, to update the pose time-sequence data (S4).

By thus performing steps S1 through S4 on a video that is input, object tracking device 10 is capable of tracking poses of objects such as persons in the video.

Example 2

Embodiment 2 describes an object tracking method employed by object tracking device 10 utilizing a particle filter and pose predictor 11 that takes two uncertainties into consideration, to predict a prediction distribution for a current frame. In Example 2, the description is provided below under the assumption that objects to be tracked are persons.

Figure 10:
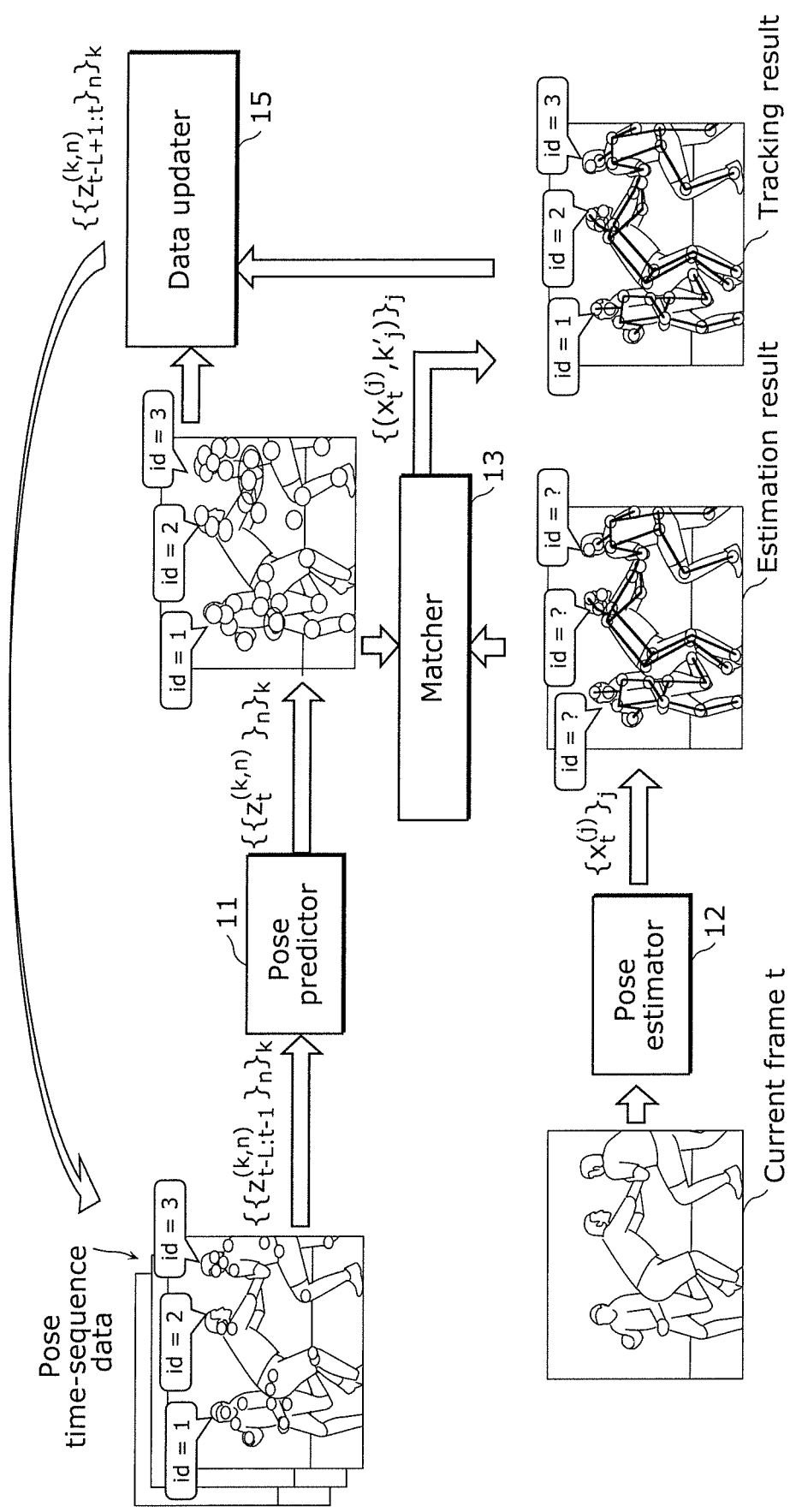
FIG. 10 is a diagram conceptually illustrating the object tracking method according to Example 2.

FIG. 9 is a diagram illustrating an example of pseudo codes indicating an object tracking method according to Example 2. FIG. 10 is a diagram conceptually illustrating the object tracking method according to Example 2. Pseudo codes illustrated in FIG. 9 are implemented by TensorFlow which is a tool for performing matrix operations, and all the independent threads and for-loops except for the outermost loop are executed on GPUs in parallel. With the use of a single NVIDIA RTX2080 GPU, it is possible to track 10 poses at 30 fps. In the pseudo codes illustrated in FIG. 9, an algorithm described as "(1) Pose Prediction" corresponds to a pose prediction process performed by pose predictor 11 in object tracking device 10. An algorithm described as "(2) Pose Estimation" corresponds to a pose estimation process performed by pose estimator 12 in object tracking device 10. An algorithm described as "(3) Greedy Matching" corresponds to a matching process performed by matcher 13 in object tracking device 10. An algorithm described as "(4) Particle Update" corresponds to an update process performed by data updater 15 in object tracking device 10.

Here, $C_t$ denotes one or more persons whose poses have been estimated from current frame t at time t, and j denotes a tentative index indicating each of one or more persons. The object tracking method performed by using such pseudo codes illustrated in FIG. 9 tracks multiple poses of multiple persons using at most $F_{max}$ filters.

Each of the multiple poses has unique track ID k and is expressed by P particles. Particle n of filter k includes an L-sized queue which stores previous poses $z^{(k,n)}_{t-L:t-1}$ During the tracking process at time t, only $F_t$ ($<F_{max}$) filters are active and executed. The activation and deactivation of the filters are controlled by lifetime counts $l_k$ which manages (dis) appearance of persons in a frame.

When algorithm 1 is started, all of the filters are inactive, as illustrated in the first line in the pseudo codes in FIG. 9.

Next, a pose prediction process is performed in the procedure described in the third and fourth lines. More specifically, in the procedure described in the third line, pose time-sequence data including $F_t \times P$ sequences of previous poses $z^{(k,n)}_{t-L:t-1}$ are collected from the active filters. Subsequently, the collected pose time-sequence data is input to pose predictor 11 to output $F_t \times P$ predicted poses $z^{(k,n)}_t$ in the procedure described in the fourth line.

It is to be noted that the procedure described in the third and fourth lines are not executed at time t=1 for the first current frame t which is one of the frames composing a video or when there is no active filters. $K_t$ denotes a set of active filters that are currently effective. In FIG. 10, pose time-sequence data is indicated as coordinates indicating a prediction distribution predicted for previous frames and IDs assigned to persons.

Next, a pose estimation process is performed in the procedure described in the fifth line. More specifically, an RGB image indicating a current frame is input to a deep CNN model as disclosed in the aforementioned NPL 1 to estimate poses $x^{(j)}_t$ of persons $C_t$ in the procedure in the fifth line. FIG. 10 illustrates the following: an estimation result is obtained by estimating, with the use of keypoints, multiple poses of the persons in the current frame by inputting the RGB image indicating the current frame to pose estimator 12; and it is unknown who the persons are (which ID should be assigned to who).

Next, a matching process is performed in the procedure from the sixth to seventeenth lines. To be more specific, firstly in the procedure described in the sixth line, $d^{(j,k,n)}_{OKS}$ indicating $C_t \times F_t \times P$ OKS values in total are calculated from $F_t \times P$ predicted poses $z^{(k,n)}_t$ and estimated poses $x^{(j)}_t$ of $C_t$, using a greedy matching method. In the procedure described in the seventh line, the shape of the $C_t \times F_t \times P$ OKS tensor is transformed to be $C_t \times F_t$ by taking a weight average along an n-axis to calculate matching score matrix. Subsequently, in the procedure described in the eighth line, bipartite matching of matching a pair with high likelihood is performed using the calculated matching score matrix. With this process, formed pairs whose matching score is below a threshold (i.e., an estimated pose and a predicted pose are placed far away) are removed to prevent inappropriate matching. Variables $j'_k$ and $k'_j$ indicated in the procedure in the eighth line denote the indices of counterparts of filter k and pose j, respectively. These variables $j'_k$ and $k'_j$ take negative values when no counterparts are assigned because of the shortage and overage of the active filters, and thresholding. $\{j'_k\}_k$ denotes an ID of a person matching certain filter k when viewed from filter k whereas $\{k'_j\}_j$ denotes a filter matching detected person j when viewed from person j.

Subsequently, when variable $k'_j$ has a valid value for pose j, a tuple of $(x^{(j)}_t, k'_j)$ is output as a tracking result in the procedure described in the tenth and eleventh lines. FIG. 10 shows a tracking result that is obtained by superimposing the tuple on the current frame t and is output from output unit 14 (not shown in the diagram). $k'_j > -1$ in the procedure in the tenth line indicates that variable $k'_j$ has a valid value for pose j and a filter worked to form a pair. In contrast, when variable $k'_j$ has an invalid value for pose j, new filter $k_{new}$ is activated in the procedure described from the twelfth to seventeenth lines. A new index is then output together with estimated pose $x^{(j)}_t$ to output unit 14.

Subsequently, in the procedure described in the fifteenth and sixteenth lines, since poses in previous frames are unknown, the queues indicating pose time-sequence data is initialized by setting 0 for invisible keypoints and also by setting a predicted pose as $x^{(j)}_t$.

Next, an update process is performed in the procedure described from the eighteenth to the twenty-sixth lines. More specifically, firstly in the procedure described in the eighteenth line, the latest prediction poses $z^{(k,n)}_t$ are pushed to the queues indicating pose time-sequence data to remove the oldest ones. Then, in the procedure described in the twentieth and the twenty-first lines, when variable $k'_j$ has a valid value for pose j, probabilistic resampling of reselecting particles is performed on the queues of filter k based on the likelihood in the previous state. Note that the procedure described in the twentieth and twenty-first lines is not executed when $j'_k < 0$.

Subsequently, in the procedure described in the twenty-second and twenty-fourth lines, lifetime count $l_k$ is incremented or decremented according to the existence of filter k's counterpart. In the procedure described in the twenty-fifth and twenty-sixth lines, when lifetime count $l_k$ is zero, a person that filter k tracks is regarded as completely disappeared and filter k is deactivated.

Example 3

Example 3 describes the results of a performance evaluation experiment for object tracking device 10, which was conducted using Pose-Track2018 dataset. In the Pose-Track2018 dataset, the annotations include the locations of 17 body keypoints and unique track IDs for multiple persons in a video. In Example 3, the description is provided below also under the assumption that objects to be tracked are persons.

In this example, training and evaluation were conducted for pose predictor 11 illustrated in FIG. 5, using the Pose-Track2018 dataset. Training data was created from training annotation data of Pose-Track2018 dataset. Pose predictor 11 was trained with the created training data, using Adam optimizer. The learning rate was $10^{-3}$ and mini-match size was 30.

FIG. 11 is a diagram illustrating the results of evaluation on object tracking performance according to Example 3. FIG. 11 summarizes multiple object tracking accuracy (MOTA) scores calculated as object tracking performance using the Pose-Track2018 dataset and a well-known evaluation tool. MOTA stands for Multiple Object Tracking Accuracy. FIG. 11 presents MOTA scores of the pose tracking method employed by pose predictor 11 as what has been achieved by the present disclosure. FIG. 11 also shows MOTA scores of the pose tracking method disclosed in NPL 1 as a comparative example, and MOTA scores of the existing pose tracking methods as reference examples 1 through 5.

As shown in FIG. 11, the pose tracking method according to the present disclosure achieved the best score of 66.2 outperforming over 65.4 attained by the pose tracking method according to the comparative example.

Next, an experiment was conducted to clarify which component(s) of pose predictor 11 illustrated in FIG. 5 contributed to the overall improvement. More specifically, the performance evaluation experiment was conducted for some of the components of pose predictor 11 illustrated in FIG. 5 in the following cases: (1) when both or either of two kinds of uncertainties are invalidated; and (2) when parameter L indicating the time length of pose time-sequence data is changed. In the present example, epistemic uncertainty modeling was removed by deactivating dropout applied to the fully-connected NN 114 illustrated in FIG. 5. On the other hand, heteroscedastic aleatoric uncertainty modeling was removed by fixing an average value (i.e., value σ) used by output processor 115 illustrated in FIG. 5.

FIG. 12 is a diagram illustrating the results of performance evaluation experiment in the case of, for instance, disabling the components of pose predictor 11 according to Example 3. In the graph illustrated in FIG. 12, when epistemic uncertainty is effectively incorporated, that is, when epistemic uncertainty modeling is enabled, a check mark is placed under the corresponding item. Similarly, when heteroscedastic aleatoric uncertainty is effectively involved, that is, when heteroscedastic aleatoric uncertainty modeling is enabled, a check mark is placed under the corresponding item. In FIG. 12, epistemic uncertainty is presented as "E. Uncertainty" while heteroscedastic aleatoric uncertainty is presented as "H.A. Uncertainty".

In FIG. 12, num_switches which is an intermediate variable to calculate MOTA was used, instead of MOTA, as principle metrics for performance evaluation. MOTA is composed of three variables that are num_switches, num_misses, and num_false_positives. The variable num_switches indicates a total number of tracking errors as in the case where the keypoints which were recognized, for example, as belonging to, for example, person A in one frame were erroneously recognized as belonging to, for example, person B in another frame. The variable num_misses indicates a total number of pose estimation errors of not recognizing the locations of the keypoints that are supposed to be recognized in a certain frame. The variable num_false_positives indicates a total number of pose estimation errors of erroneously recognizing keypoints that are not supposed to be recognized in a certain frame. In FIG. 12, num_switches of the pose tracking method disclosed in NPL 1 is presented as a comparative example, and the MOTA score of the comparative example is also presented for reference.

By comparing a value of num_switches obtained by the present disclosure with a value of num_switches obtained by the comparative example in FIG. 12, the experiment shows that the MOTA scores attained by pose predictor 11 which are indicated in FIG. 11 are achieved by the pose prediction performed by pose predictor 11, not by more accurate pose estimation. Moreover, in the comparison on the num_switches values between the present disclosure and the comparative example, the experiment demonstrates that pose predictor 11 according to the present disclosure achieves approximately 50% reduction of tracking errors, as shown in FIG. 12.

As can be seen from FIG. 12, involving the two kinds of uncertainties contributes to the improvement in tracking performance. With the use of pose predictor 11 involving the two kinds of uncertainties, by referring to longer context of poses (e.g., L=10, 15), MOTA scores are high. In other words, with the use of pose predictor 11 that takes the two kinds of uncertainties into consideration, it is possible to infer more plausible hypotheses (prediction pose locations), resulting in final performance improvement. However, parameter L should be determined carefully because it affects the computational complexity (i.e., memory size and computational time of sequential LSTM forwarding) and the stability of training. In the description so far, pose time-sequence information is held explicitly as a history of previous records by the use of queues, but the way to hold time-sequence information is not limited to this. For example, holding local variables in LSTM may replace the use of queues.

[Advantageous Effects Achieved by Object Tracking Device 10]

As described above, with object tracking device 10 according to the present disclosure, it is possible to inhibit tracking errors by performing pose tracking of persons in a video using pose predictor 11 that performs pose prediction with consideration given to uncertainties of prediction results. In this embodiment, pose tracking of persons in a video is performed utilizing particle filters and pose predictor 11 that performs pose prediction with consideration given to two kinds of uncertainties. The two kinds of uncertainties of epistemic uncertainty and heteroscedastic aleatoric uncertainty are modeled and incorporated into pose predictor 11. This enables pose predictor 11 to predict diverse and plausible hypotheses (i.e., prediction pose locations) using a prediction distribution of a pose of each person shown in a current frame (i.e., a distribution of the locations of keypoints). Moreover, by introducing a recurrent neural network to pose predictor 11, long-term context information can be utilized. It is therefore possible to reduce tracking errors even when occlusion occurs in the tracking of a person in a video.

Figure 13:
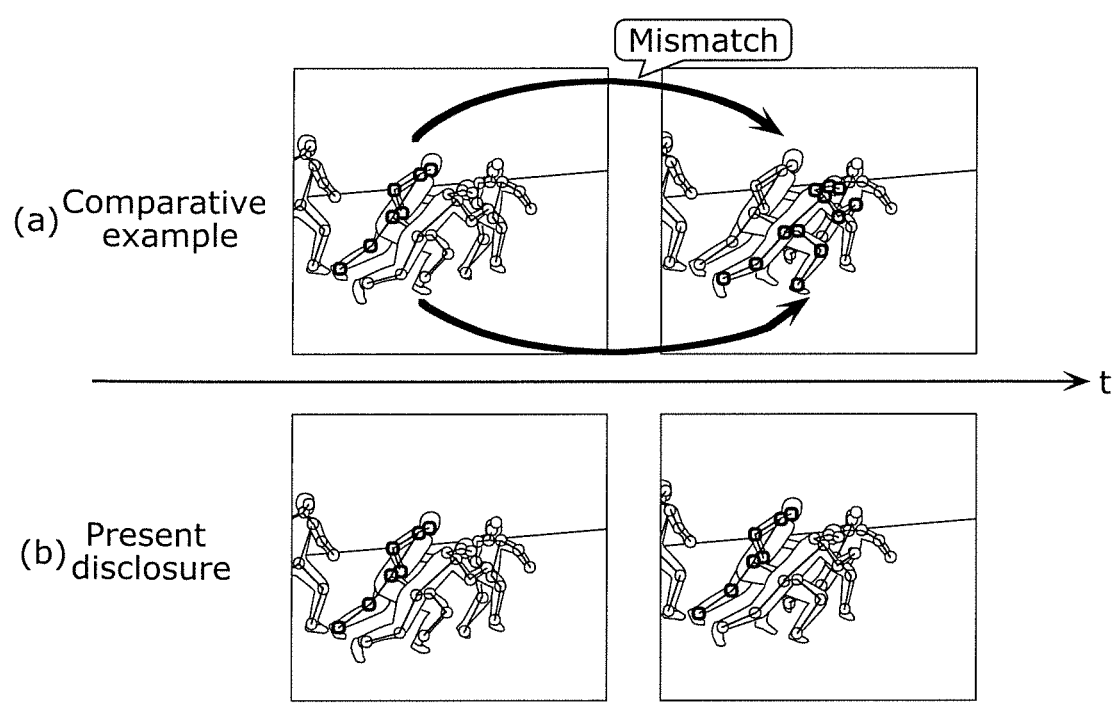
FIG. 13 is a diagram visually illustrating results of object tracking based on an object tracking method according to the present disclosure and results of object tracking based on an object tracking method according to the comparative example.

The following describes the effects achieved by object tracking device 10 with reference to FIG. 13 and FIG. 14.

FIG. 13 and FIG. 14 are each a diagram visually illustrating the result of object tracking based on an object tracking method according to the present disclosure and an object tracking method according to the comparative example. FIG. 13 shows a pose tracking result in the case where three persons are moving very fast in a video, that is, the case where the poses of multiple persons change very fast. FIG. 14 shows a pose tracking result in the case where one person is hidden by another person in the second frame and the hidden person reappears in the third frame, that is, the case where occlusion occurs in the tracking of a human pose in a video, in three time-sequence frames composing a video. In each of (a) in FIG. 13 and (a) in FIG. 14, a pose tracking result based on the pose tracking technique disclosed in NPL 1 is shown as a comparative example. In each of (b) in FIG. 13 and (b) in FIG. 14, a pose tracking result obtained by object tracking device 10 according to the present embodiment is shown as what has been achieved by the present disclosure.

More specifically, (a) in FIG. 13 shows that in a later frame of the time-sequence frames, keypoints indicated by bold circles are assigned to a person different from a person in the previous frame, resulting in a tracking error of misidentifying a person between the frames. On the other hand, (b) in FIG. 13 shows that between the frames in the time-sequence frames, keypoints indicated by bold circles are assigned to the same person, resulting in accurate identification and reduction of tracking errors.

In (a) in FIG. 14, for a person in the tracking of who the occlusion occurs, keypoints indicated in circles are assigned to a person in the first frame in the time-sequence frames and keypoints indicated in dotted circles are assigned to a person in the last frame, resulting in the misidentification of erroneously identifying, as a different person, a person who should be identified as a same person. In contrast, (b) in FIG. 14 shows that keypoints indicated by circles are assigned to a person in the tracking of who occlusion occurs both in the first frame and the last frame in time-sequence frames, resulting in accurate identification of the person and reduction of tracking errors.

As described above, with object tracking device 10 according to this embodiment, it is possible to reduce tracking errors even when disturbance such as high-speed pose changing, or disappearances or reappearances of poses by occlusion occurs.

POSSIBILITY FOR OTHER EMBODIMENTS

Although the object tracking method according to the embodiment has been described so far, it should be understood that a main body or a device by which each of the processes of the object tracking method is performed is not particularly limited. Each process may be carried out by a processor (to be described below) incorporated into a specific device that is locally installed, or by a cloud server provided in a location different from the location of the locally-installed device.

The present disclosure is not limited to the aforementioned embodiment. A different embodiment formed by arbitrarily combining the elements described in the Specification or realized by excluding some of the elements may be included in the present disclosure. Forms obtained by various modifications to foregoing embodiment that can be conceived by a person skilled in the art as well as forms realized by arbitrarily combining structural components and functions in the embodiment within the scope of the essence of the present disclosure are also included in the present disclosure.

For example, a-divergence dropout and neural network ensembles may be employed for aleatoric uncertainty modeling. Moreover, a prediction distribution may be expressed by a Gaussian mixture model instead of the above-mentioned Gaussian distribution by introducing Mixture Density Networks for aleatoric uncertainty modeling.

The object tracking method according to the present disclosure utilizes particle filters, pose prediction that takes two kinds of uncertainties into consideration, and context information. This suggests that the object tracking method according to the present disclosure is applicable to various Sequential Monte Carlo (SMC)-based robotic engineering such as simultaneous localization and mapping (SLAM). The object tracking method according to the present disclosure may be applied not only to two-dimensional human pose tracking but also to three-dimensional human pose tracking.

The present disclosure further includes the following cases.

(1) The aforementioned device is specifically a computer system including a microprocessor, ROM, RAM, a hard disk unit, a display unit, a keyboard, a mouse, etc. The RAM or hard disk unit stores a computer program. Each device realizes its function by the microprocessor operating in accordance with the computer program. The computer program is configured by combining several instruction codes each indicating an instruction for a computer to achieve predetermined functions.

(2) Part or all of processing units included in the device may be included in one system large scale integration (LSI). The system LSI is a super multi-functional LSI manufactured by integrating a plurality of components on a chip and is specifically a computer system including a microprocessor, ROM, RAM, etc. The system LSI achieves its function by the microprocessor operating in accordance with the computer program.

(3) Part or all of the processing units included in the device may be a single module or an IC card attachable and detachable to and from each device. The IC card or module is a computer system including a microprocessor, ROM, RAM, etc. The IC card or module may include the aforementioned super multi-functional LSI. The card or module realizes its function by the microprocessor operating in accordance with a computer program. The IC card or module may have tamper resistance.

(4) The present disclosure may be each of the methods described above. Moreover, the present disclosure may be a computer program for realizing the methods using a computer or a digital signal including the computer program.

(5) The present disclosure may be a computer-readable recording medium such as a flexible disc, a hard disk, CD-ROM, MO, DVD, DVD-ROM, DVD-RAM, Blu-ray disc (®) (BD), or a semiconductor memory having the computer program or digital signal recorded thereon. Moreover, the present disclosure may be the digital signal recorded on such a recording medium.

The present disclosure may be a medium transferring the computer program or digital signal via electric communication lines, wireless or wired communication lines, a network represented by the Internet, data broadcasting, etc.

The present disclosure may be a computer system including a microprocessor and a memory. The memory may store the computer program and the microprocessor may operate in accordance with the computer program.

The present disclosure may be implemented by another independent computer system by transferring the program or digital signal recorded on the recording medium or transferring the program or digital signal via the network, for instance.

Each of the elements in each of the above-described embodiments may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory. Here, the software program for realizing the object tracking method according to each of the embodiments is a program described below.

The program causes a computer to execute: predicting, by a pose predictor, a prediction distribution by inputting pose time-sequence data to the pose predictor, the pose predictor including a first neural network and performing pose prediction which takes uncertainty into consideration, the prediction distribution being a distribution of each of prediction pose locations of one or more first objects in a current frame, the pose time-sequence data including coordinates indicating a pose of each of the one or more first objects in at least two previous frames in time sequence; estimating, by a second neural network, a set of locations of each of one or more second objects in the current frame by inputting the current frame to the second neural network; obtaining identification information and location information by matching the set of locations and the prediction distribution, to output the identification information and location information obtained, the identification information indicating a one-to-one correspondence between the one or more second objects and the one or more first objects, the location information indicating a location of a pose of each of the one or more second objects; and updating the pose time-sequence data by adding, to the pose time-sequence data, data including coordinates indicating a pose of each of the one or more first objects based on the identification information and the location information obtained in the obtaining, the data being obtained from the prediction distribution predicted in the predicting.

The herein disclosed subject matter is to be considered descriptive and illustrative only, and the appended Claims are of a scope intended to cover and encompass not only the particular embodiment disclosed, but also equivalent structures, methods, and/or uses.

INDUSTRIAL APPLICABILITY

The present disclosure is applicable to an object tracking method and a non-transitory computer-readable recording medium having a program for executing the object tracking method recorded thereon, and particularly applicable to a two-dimensional human pose tracking method of tracking poses of multiple persons in a video and a non-transitory computer-readable recording medium having a program for executing the two-dimensional human pose tracking method recorded thereon.

The invention claimed is:

1. An object tracking method performed by a computer for tracking an object in a video, the object tracking method comprising:

predicting, by a pose predictor, a prediction distribution by inputting pose time-sequence data to the pose predictor, the pose predictor including a first neural network and performing pose prediction which takes uncertainty into consideration, the prediction distribution being a distribution of each of prediction pose locations of one or more first objects in a current frame, the pose time-sequence data including coordinates indicating a pose of each of the one or more first objects in at least two previous frames in time sequence;

estimating, by a second neural network, a set of locations of each of one or more second objects in the current frame by inputting the current frame to the second neural network;

obtaining identification information and location information by matching the set of locations and the prediction distribution, to output the identification information and location information obtained, the identification information indicating a one-to-one correspondence between the one or more second objects and the one or more first objects, the location information indicating a location of a pose of each of the one or more second objects; and updating the pose time-sequence data by adding, to the pose time-sequence data, data including coordinates indicating a pose of each of the one or more first objects based on the identification information and the location information obtained in the obtaining, the data being obtained from the prediction distribution predicted in the predicting.

2. The object tracking method according to claim 1, wherein in the obtaining, the matching is performed to calculate a pair of the prediction distribution and the set of the locations, the pair attaining a matching score that is at least a predetermined value, and the identification information and the location information are obtained based on the pair calculated and are output.

3. The object tracking method according to claim 2, wherein in the obtaining, the matching performed to calculate the pair is bipartite matching.

4. The object tracking method according to claim 1, wherein in the predicting, the first neural network predicts the prediction distribution using one or more models for taking the uncertainty into consideration, by causing each of the one or more models to predict the prediction pose locations from the pose time-sequence data.

5. The object tracking method according to claim 4, wherein the prediction distribution takes the uncertainty into consideration, includes the prediction pose locations predicted, and is expressed by dispersion of a Gaussian distribution.

6. The object tracking method according to claim 4, wherein the first neural network includes a recurrent neural network and a predetermined neural network that creates the one or more models.

7. The object tracking method according to claim 6, wherein the one or more models are created by applying dropout to the predetermined neural network and inactivating one or more nodes constituting the predetermined neural network.

8. A non-transitory computer-readable recording medium for use in a computer, the recording medium having a computer program recorded thereon for causing the computer to execute:

predicting, by a pose predictor, a prediction distribution by inputting pose time-sequence data to the pose predictor, the pose predictor including a first neural network and performing pose prediction which takes uncertainty into consideration, the prediction distribution being a distribution of each of prediction pose locations of one or more first objects in a current frame, the pose time-sequence data including coordinates indicating a pose of each of the one or more first objects in at least two previous frames in time sequence;

estimating, by a second neural network, a set of locations of each of one or more second objects in the current frame by inputting the current frame to the second neural network;

obtaining identification information and location information by matching the set of locations and the prediction distribution, to output the identification information and location information obtained, the identification information indicating a one-to-one correspondence between the one or more second objects and the one or more first objects, the location information indicating a location of a pose of each of the one or more second objects; and updating the pose time-sequence data by adding, to the pose time-sequence data, data including coordinates indicating a pose of each of the one or more first objects based on the identification information and the location information obtained in the obtaining, the data being obtained from the prediction distribution predicted in the predicting.

* * * * *